United States Patent
Mautsch et al.

[11] Patent Number: 6,113,146
[45] Date of Patent: Sep. 5, 2000

[54] ROLLER GUIDE AND HOLDER FOR AN AUTOMOTIVE SAFETY RESTRAINT

[75] Inventors: Jürgen Mautsch, Senden; Martin Wifling, Blaustein; Robert Kopetzky, Lonsee; Oskar Scholler, Vöhringen; Horst Krammel, Wettstetten, all of Germany

[73] Assignee: Takata (Europe) Vehicle Safety Technology GmbH, Ulm, Germany

[21] Appl. No.: 09/190,449

[22] Filed: Nov. 13, 1998

[30] Foreign Application Priority Data

Nov. 17, 1997 [DE] Germany .............. 197 50 903

[51] Int. Cl.⁷ .................................... B60R 22/18
[52] U.S. Cl. ............................................. 280/808
[58] Field of Search ................................ 280/808

[56] References Cited

U.S. PATENT DOCUMENTS

| | | | |
|---|---|---|---|
| 4,389,059 | 6/1983 | Stephenson | 280/808 |
| 4,667,982 | 5/1987 | Volk et al. | 280/808 |
| 5,415,432 | 5/1995 | Thomas | 280/808 |
| 5,415,433 | 5/1995 | Pfeiffer | 280/808 |
| 5,673,936 | 10/1997 | Möndel | 280/808 |

FOREIGN PATENT DOCUMENTS

| | | |
|---|---|---|
| 78 22 778 | 12/1977 | Germany . |
| 29 05 862 | 8/1980 | Germany . |
| 29 12 248 | 10/1980 | Germany . |
| 295 02 192 | 6/1995 | Germany . |

*Primary Examiner*—Kenneth R. Rice
*Attorney, Agent, or Firm*—Foley & Lardner

[57] ABSTRACT

A roller guide assembly for a safety belt comprising a holder which can be secured to a vehicle part and which journals a guide roller between two bearings. In this, the bearings are formed resiliently. The invention prevents the bearings from prematurely wearing and avoids many of the high stress to which bearings in other roller guides are subjected.

19 Claims, 4 Drawing Sheets

ROLLER GUIDE AND HOLDER FOR AN AUTOMOTIVE SAFETY RESTRAINT

BACKGROUND OF THE INVENTION

1.) Field of the Invention

The present invention relates to a roller guide for a safety belt comprising a holder adapted to be secured to a vehicle part and which journals the roller guide between two bearings.

2.) Related Prior Art

Roller guides are known in different variants. Roller guides of the subject kind are used in motor vehicles to deflect a belt which is wound off a belt roller in a direction towards the passenger. In these roller guides, the bearings often are subjected to disadvantageous high stresses resulting in premature wear.

SUMMARY OF THE INVENTION

An object of the invention is to provide a roller guide assembly which avoids or reduces the effects of high stresses.

Another object of the invention is to provide a roller guide assembly for use with a safety restraint of an automobile that reduces bearing wear.

Yet another object of the invention is to provide a roller guide assembly which is simple and cost-effective to manufacture.

These objects are satisfied by the present invention, which comprises a holder adapted to be secured to a motor vehicle; a pair of bearings, each of said pair of bearings being disposed on a side of said holder, wherein at least one of said bearings is resilient; and a guide roller which is journaled by said holder between said two bearings.

Other features of the different embodiments of the invention include, inter alia, a plastic form part inserted in a circular opening of said holder to reduce noise when the holder is pivoted about its vehicle mounting point; two bores in a central region of the holder, the bores extending coaxially with respect to one another; two circular guide openings in said holder extending at substantially right angles to the bores; a shaft mounted in the holder by the pair of bearings, wherein an interior of said guide roller has a circumferential ring projection and said shaft has two circumferential ring grooves for latching in the circumferential ring projection of said guide roller; each of said pair of bearings has a sleeve-like shape and is open at one end and closed at an opposite end; each bearing has a smaller diameter region and a larger diameter region.

Further objects, features, and advantages of the present invention will be readily apparent from consideration of the detailed description of the preferred embodiment which follow.

BRIEF DESCRIPTION OF THE DRAWINGS

The invention will be explained in the following in a purely exemplary manner with reference to advantageous embodiments and with reference to the accompanying drawings, in which.

DETAILED DESCRIPTION OF THE PREFERRED EMBODIMENTS

Figure 1:
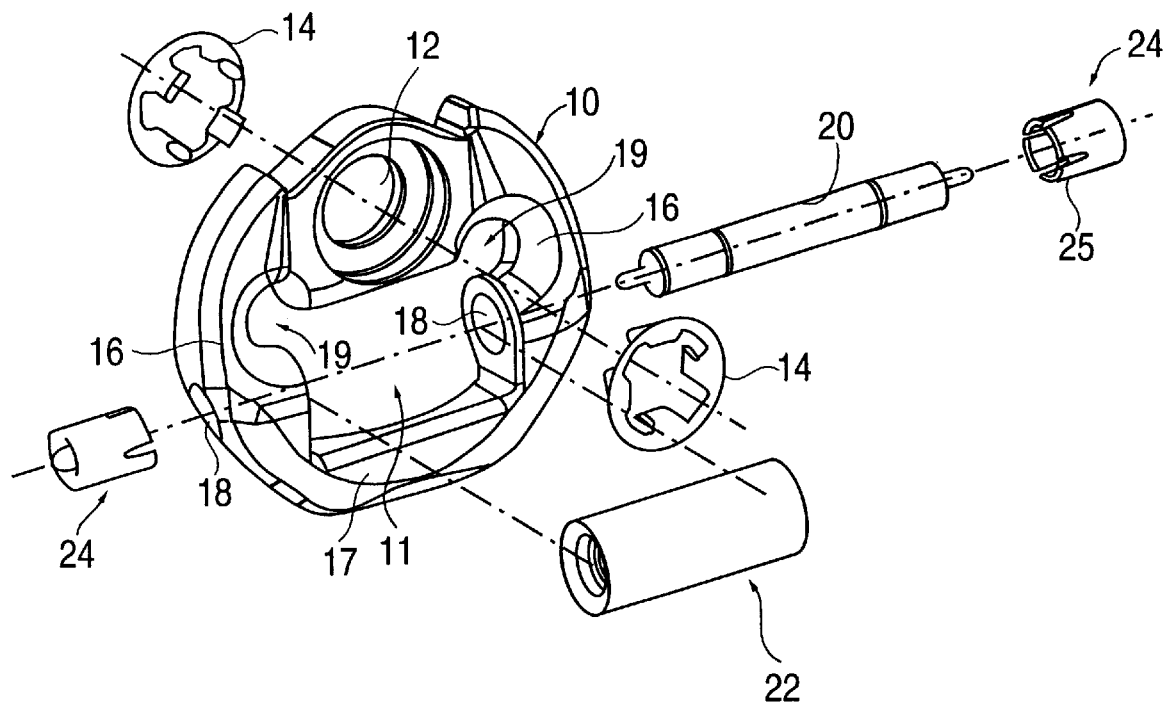
FIG. 1 is an exploded view of a roller guide with its associated parts.

FIG. 1 shows a roller guide for a safety belt in an exploded view. The roller guide has a holder 10 of metal and which is approximately oval in a plan view. The holder 10 has a basically rectangular upwardly open cut-out 11 provided for a guide roller 22. Above the cut-out 11 is a circular opening 12 for securing a guide roller 22. A plastic form part 14 can be inserted in the front and rear side of the opening 12 to reduce the noise when the holder 10 is pivoted.

The holder 10 is convex shaped above the cut-out 12 and has limb-like outward formations 16, each extending downwardly, outwardly vaulted, and running together in a web beneath the cut-out. Within the cut-out 11, and in the central region of the holder 10, are two circular apertures in the form of bores 18, each of which passes through an outward formation 16 and extends coaxially with respect to one another and parallel to the web 17. Above the bores 18, which serve for the reception of one bearing 24, and extending at right angles to the bores, are two circular guide openings 19 in the holder 10. The edges of the circular guide openings 19 extend in a convexity curved manner from the central plane of the holder 10 to their front and rear side and are open in a direction toward the upper side of the cut-out 11. These guide openings serve for the friction-poor guidance of the belt band in the event that the latter is rolled off or rolled on at an inclination. The two bearings 24 journal a shaft 20 between themselves, the shaft being connected to the guide roller 22.

To assemble the guide roller, the shaft 20 is introduced from one side of the holder 10 into a bore 18 from there and up to the oppositely lying bore 18 of the other limb 16, with the guide roller 22, which after insertion of the shaft 20 is passed through by the latter, having previously been placed in the cut-out 11 between the two limbs 16. Then a bearing 24 is introduced into the passage bore 18 from each side of the holder 10 and latched there. Each end of the shaft 20 now engages in a bearing 24 and carries the guide roller 22 which is firmly latched to the shaft 20. The form parts 14 are pressed from both sides into the opening 12. The assembly is completed by attaching the holder to a vehicle part, preferably at a B-column of a motor vehicle, trough the circular opening 12 and the latched in form parts 14.

Figure 2:
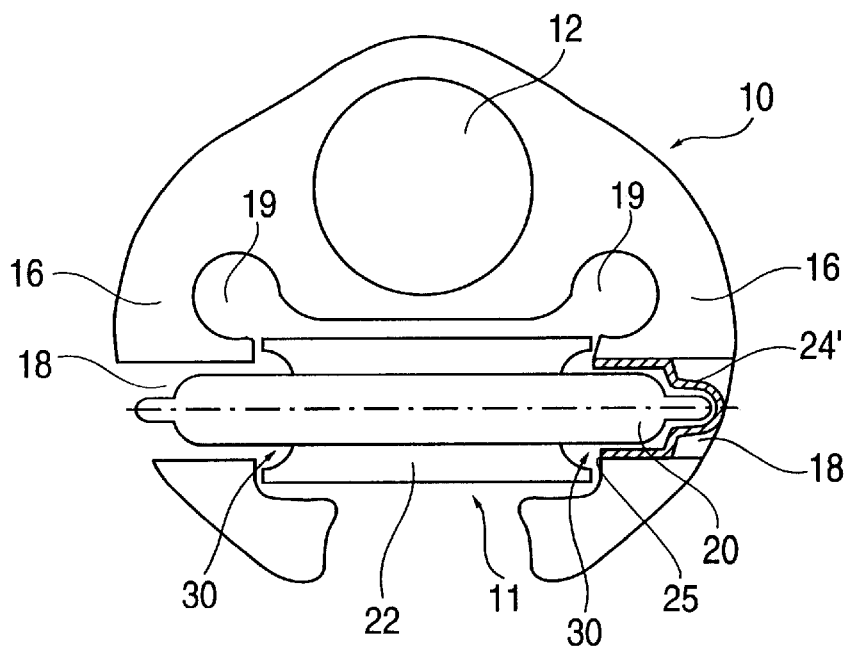
FIG. 2 is a partially sectioned front view of a further embodiment of a roller guide.

FIG. 2 shows a partly sectioned view of a further embodiment of a roller guide, with the same reference symbols being used for the same parts. The embodiment illustrated in FIG. 2 differs from that illustrated in FIG. 1 substantially in that the outward formations 16 do not run together in a web beneath the rectangular cut-out 11. The bearing 24 illustrated in FIG. 2 (for the sake of clarity only one bearing 24 is illustrated) corresponds to the embodiment illustrated in FIG. 6, which will be described in more detail in the following.

As is easily recognized in FIG. 2, the circular guide openings, which are located above and at both sides of the guide roller and which open in the direction of the upper edge of the guide roller, serve for the guidance of the belt band when the latter (for example when fastening a child's seat) is drawn off at an inclination. As is also easily recognized, the guide roller 22 has concave cut-outs 30 at both its end sides, each cut-out preventing contact between the guide roller 22 and the bearings 24. The bearing 24 is located (as it is in the embodiment of FIG. 1) up to a widened edge 25 in the bore 18. The outer surface of the larger diameter region contacts the inner wall of the bore 18.

Figure 3:
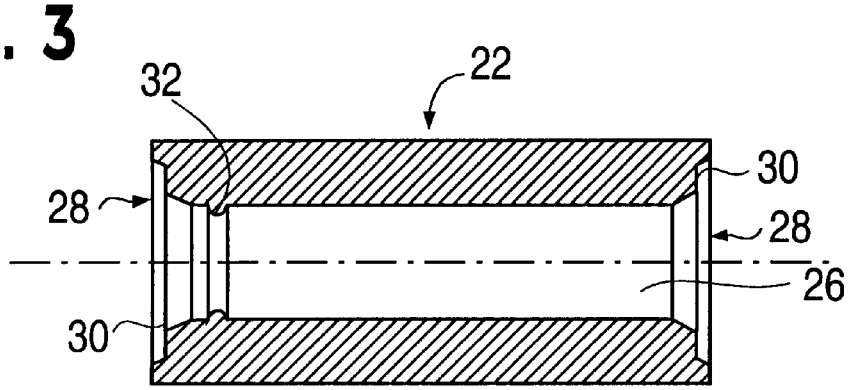
FIG. 3 is a longitudinal section through a roller guide.

FIG. 3 shows a longitudinal section through the guide roller 22 illustrated in FIG. 1 provided with an axial passage bore 26. Each end side 28 of the guide roller 22 has stepped cut-outs 30. A circumferential ring projection 32, which serves for latching the guide roller 22 onto the shaft 20, is provided in the interior of the guide roller 22 illustrated in FIG. 3.

Figure 4:
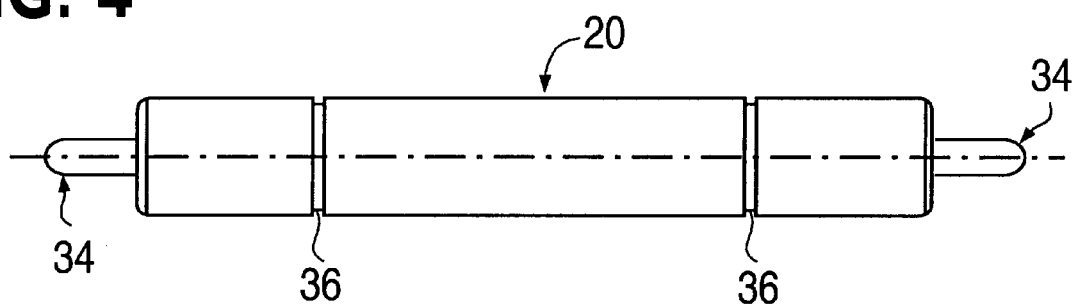
FIG. 4 is a side view of a shaft.

FIG. 4 shows, in detail, the shaft 20 illustrated in FIGS. 1 and 2. Each end of the shaft 20 has a pin-like extension with a convexity formed end 34. Furthermore, the shaft 20 has two circumferential ring grooves 36 serving to latch in the ring projection 32 of the guide roller 22.

Figure 5:
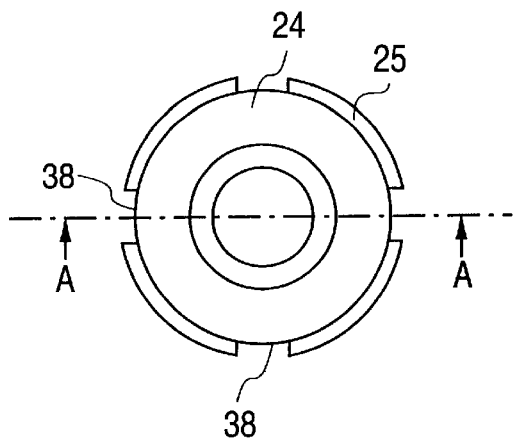
FIG. 5 is a view of the open end side of a bearing.
Figure 5A:
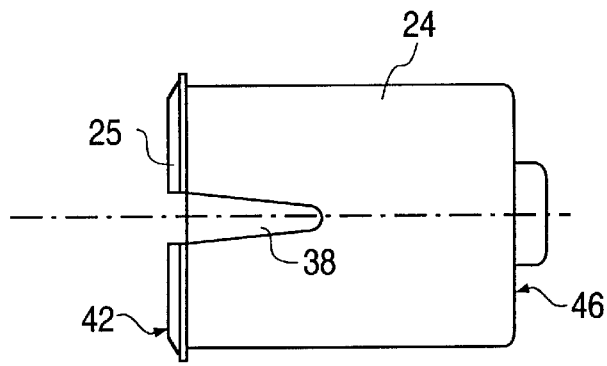
FIG. 5a is a side view of the bearing of FIG. 5.
Figure 5B:
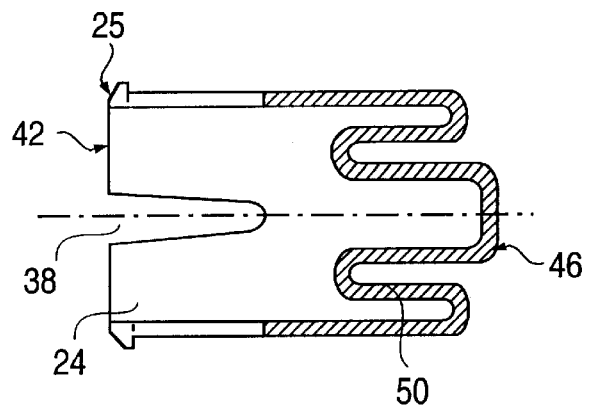

FIG. 5 shows an enlarged front view and FIG. 5a an enlarged side view of the bearing 24 of FIG. 1. A longitudinal section through this bearing is illustrated in FIG. 5b.

As these figures show, the bearing 24 has a sleeve-like shape and is open at its left (in FIGS. 5a and 5b) end 42 and closed at the oppositely lying end 46. At the outer periphery of its open end 42, the bearing 24 has a widened edge 25 having an inclined ramp so that the bearing can be inserted into the bore 18 of the holder 10. At the open end 42 of the bearing 24 are four slit-like cut-outs 38 extending in the axial direction, with two cut-outs being arranged to lie oppositely to one another. The cut-outs 38 are formed conically and extend approximately over one third of the bearing.

The bearing 24 is basically cylindrically and has two regions with different diameters. The region with the larger diameter extends over nearly the entire length of the bearing 24. The smaller diameter region is located predominantly inside the region with the larger diameter and is connected to the region of the larger diameter via a formation 50 which is meander-shaped in cross-section.

Figure 6:
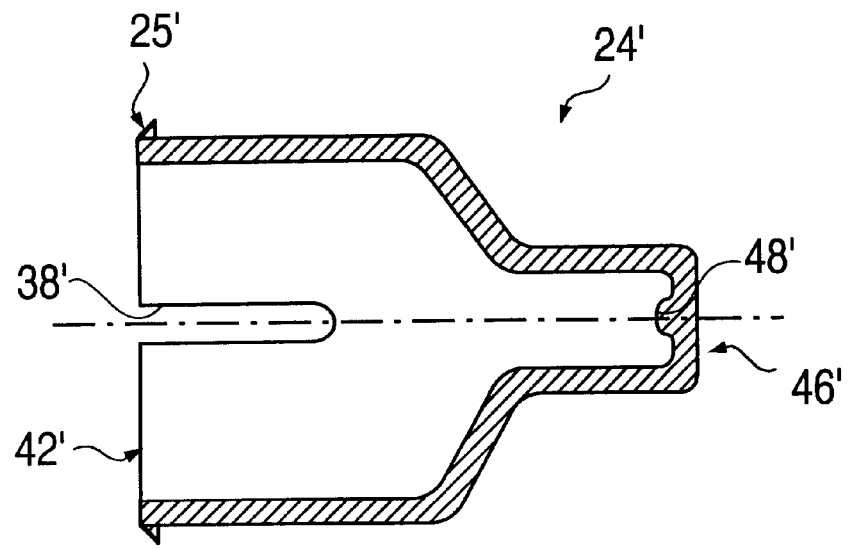
FIG. 6 is a sectioned side view of a further embodiment of a bearing.

FIG. 6 shows a further embodiment of a bearing 24' also having large and small diameter regions. The transition region contracts conically and the smaller diameter region lies completely outside the larger diameter region so that a bottleneck-like cross-section results. A convex bearing surface 48' is concentrically positioned and is arranged at the inner side of the closed end 46'. The open end 42' of the bearing 24' also has a widened edge 25'. Two substantially rectangular cut-outs 38' extend from the open end 42' in the axial direction of the bearing. The smaller diameter is approximately 40% of the larger diameter in this embodiment.

Figure 7:
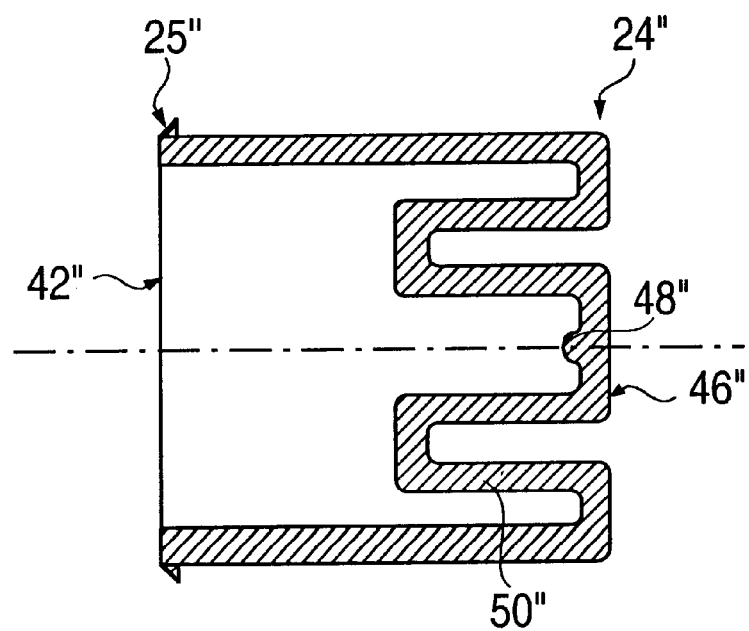
FIG. 7 a sectioned side view of a further embodiment of a bearing.

FIG. 7 shows the cross-sectional view of a further embodiment, which is similar to that illustrated in FIGS. 5 to 5b. In this embodiment the smaller diameter region of the bearing 24" is located completely within the larger diameter region. A convex bearing surface 48" is provided centrally at the inner end side of the closed end 46". The smaller diameter region extends over about 50% of the axial length of the bearing 24".

Priority application German 197 50 903.7, filed Nov. 12, 1997, including the specification, claims, drawings, and abstract, is hereby incorporated by reference.

What is claimed is:

1. A device for a safety apparatus, comprising:
   a holder adapted to be secured to a motor vehicle;
   a pair of bearings, each of said pair of bearings being disposed on a side of said holder, wherein at least one of said bearings is resilient and wherein each of said pair of bearings has a sleeve-like shape and is open at one end and closed at an opposite end; and
   a guide roller which is journaled by said holder between said pair of bearings.

2. A device for a safety apparatus as claimed in claim 1, wherein said holder has a cut-out for journalling said guide roller and at least one limb-like outward formation.

3. A device for a safety apparatus as claimed in claim 2, further comprising a plastic form part inserted in a circular opening of said holder.

4. A device for a safety apparatus as claimed in claim 1, further comprising two bores in a central region of said holder.

5. A device for a safety apparatus as claimed in claim 4, wherein said bores extend coaxial with respect to on another.

6. A device for a safety apparatus as claimed in claim 5, further comprising two circular guide openings in said holder extending at substantially right angles to said bores.

7. A device for a safety apparatus as claimed in claim 6, wherein a larger diameter region of each of said pair of bearings contacts an inner wall of each of said bores.

8. A device for a safety apparatus as claimed in claim 6, wherein each end of said guide roller has a concave cut-out.

9. A device for a safety apparatus as claimed in claim 6, wherein each end side of said guide roller has a stepped cut-out.

10. A device for a safety apparatus as claimed in claim 1, wherein each of said pair of bearings has a widened edge at an outer periphery of said open end.

11. A device for a safety apparatus as claimed in claim 10, wherein said widened edge has an inclined ramp.

12. A device for a safety apparatus as claimed in claim 11, wherein said open end has four slit-like cut-outs extending in an axial direction.

13. A device for a safety apparatus as claimed in claim 12, wherein at least one of said four slit-like cut-outs is disposed opposite another of said cut-outs.

14. A device for a safety apparatus as claimed in claim 13, wherein each of said cut-outs is conically shaped and extends about one-third of a length of each of said pair of bearings.

15. A device for a safety apparatus as claimed in claim 1, wherein each of said pair of bearings has a smaller diameter region and a larger diameter region.

16. A device for a safety apparatus as claimed in claim 15, wherein said larger diameter extends nearly an entire length of each of said pair of bearings, said smaller diameter region being located predominantly inside said larger diameter region and said larger and smaller diameter regions are connected by a formation having a meander-shaped cross-section.

17. A device for a safety apparatus as claimed in claim 16, wherein a transition region between said smaller and larger diameter regions contracts in a conical manner and said smaller region extends completely outside said larger region.

18. A device for a safety apparatus as claimed in claim 17, wherein said smaller diameter region lies completely inside said larger diameter region and a convex bearing surface is provided centrally at an inner end side of a closed end of each of said bearings.

19. A device for a safety apparatus comprising:
   a holder adapted to be secured to a motor vehicle;
   a pair of bearings, each of said pair of bearings being disposed on a side of said holder, wherein at least one of said bearings is resilient;
   a shaft mounted in said holder by said pair of bearings; and
   a guide roller which is journaled by said holder between said pair of bearings,
   wherein an interior of said guide roller has a circumferential ring projection and said shaft has two circumferential ring grooves for latching in the circumferential ring projection of said guide roller.

* * * * *